F. J. SARMIENTO.
UNIVERSAL JOINT COVER.
APPLICATION FILED JULY 24, 1916.
1,236,768. Patented Aug. 14, 1917.
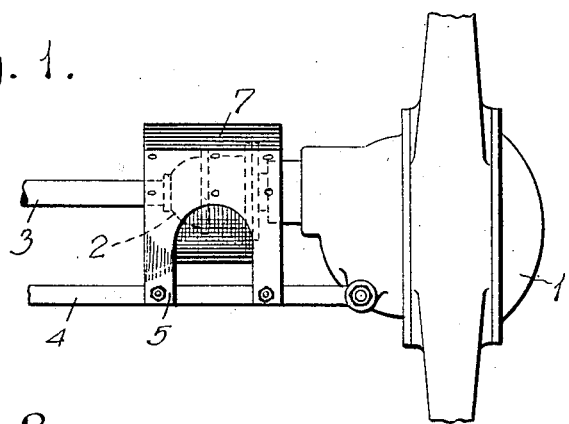
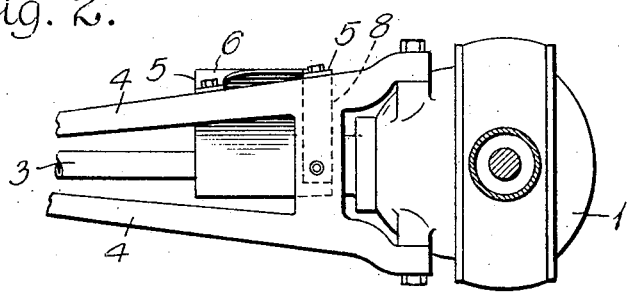
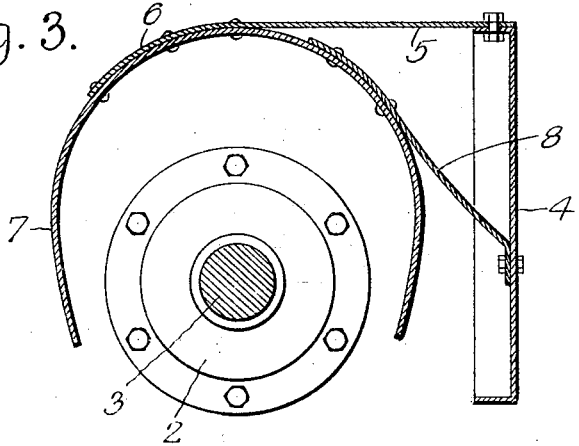
Witnesses
Inventor
Francis J. Sarmiento,
By
Attorneys

UNITED STATES PATENT OFFICE.

FRANCIS J. SARMIENTO, OF DETROIT, MICHIGAN.

UNIVERSAL-JOINT COVER.

1,236,768.   Specification of Letters Patent.   Patented Aug. 14, 1917.

Application filed July 24, 1916. Serial No. 110,832.

*To all whom it may concern:*

Be it known that I, FRANCIS J. SARMIENTO, a citizen of the United States of America, residing at Detroit, in the county of Wayne and State of Michigan, have invented certain new and useful Improvements in Universal-Joint Covers, of which the following is a specification, reference being had therein to the accompanying drawings.

This invention relates to a universal joint cover and the object of my invention is to prevent the accumulation of lubricating oils and dirt incident thereto upon vehicular parts contiguous to a universal joint.

A further object of my invention is to provide a simple, durable and inexpensive cover for a universal joint which may be easily and quickly attached to the radius rod or frame of an automobile, so that the cover or shield will be supported above the universal joint connecting the drive shaft to the differential of the automobile.

With the above and other objects in view, my invention resides in the novel construction to be hereinafter specifically described and then claimed, and reference will now be had to the drawings, wherein—

Figure 1 is a plan of the universal joint cover in position;

Fig. 2 is a side elevation of the same;

Fig. 3 is an enlarged cross sectional view of the cover.

In the drawings, 1 denotes a differential mechanism of the ordinary and well known type disclosed in connection with automobiles and various types of motor driven vehicles. In front of this differential there is a universal joint 2 coupling a drive shaft 3 to the differential mechanism and imparting movement to the rear wheels of an automobile. Associated with the elements just described is a radius rod or frame 4 at one side of the universal joint 2, and connected to this radius rod or frame are the arms 5 of a plate 6 overhanging the universal joint 2. Riveted or otherwise connected to the plate 6 is an inverted U-shaped cover or shield 7 made of metal or leather, preferably the former and coöperating with the plate in properly positioning the cover or shield is a brace 8, made of metal, and connecting the radius rod or frame 4 to the cover or shield 7, beneath one of the arms 5, as best shown in Fig. 2. The shape of the cover or shield is such as to prevent lubricating oils, used in connection with the universal joint 2, from being thrown upwardly and outwardly onto the vehicular parts in proximity to a universal joint, consequently the chassis or running gear of an automobile is maintained in a far cleaner condition than if the cover or shield was dispensed with. The shape and position of the cover or shield relative to the universal joint is such that the joint can be supplied with a lubricant without removing the cover or shield, and as fast as lubricating oil and foreign matter accumulate upon the inner side of the cover or shield, a hand may be inserted between the cover and universal joint to remove such matter as accumulates in the cover.

I attach considerable importance to the simplicity of construction entering into the shield or cover as it practically consists of three pieces that may be readily assembled and used in connection with many types of automobiles.

One embodiment of my invention has been illustrated but it is to be understood that the structural elements are susceptible to such variations and modifications as fall within the scope of the appended claim.

What I claim is:—

The combination of a universal joint, a radius rod, a plate attached to said radius rod, a shield carried by said plate and extending above the universal joint, and a brace connecting said shield to the radius rod.

In testimony whereof I affix my signature in the presence of two witnesses.

FRANCIS J. SARMIENTO.

Witnesses:
KARL H. BUTLER,
ANNA M. DORR.

Copies of this patent may be obtained for five cents each, by addressing the "Commissioner of Patents, Washington, D. C."